United States Patent
Hashiguchi

(10) Patent No.: US 9,215,508 B2
(45) Date of Patent: Dec. 15, 2015

(54) OPTICAL TRANSMISSION SYSTEM

(71) Applicant: Nihon Video System Co., Ltd., Tsushima-shi, Aichi (JP)

(72) Inventor: Kentaro Hashiguchi, Tsushima (JP)

(73) Assignee: Nihon Video System Co., Ltd., Tsushima-shi (JP)

( * ) Notice: Subject to any disclaimer, the term of this patent is extended or adjusted under 35 U.S.C. 154(b) by 0 days.

(21) Appl. No.: 13/945,676

(22) Filed: Jul. 18, 2013

(65) Prior Publication Data

US 2014/0026177 A1  Jan. 23, 2014

(30) Foreign Application Priority Data

Jul. 20, 2012 (JP) .................................. 2012-161673

(51) Int. Cl.
| | |
|---|---|
| H04N 21/61 | (2011.01) |
| H04N 21/65 | (2011.01) |
| H04N 21/434 | (2011.01) |
| H04N 21/60 | (2011.01) |
| H04B 10/25 | (2013.01) |

(52) U.S. Cl.
CPC ....... *H04N 21/6156* (2013.01); *H04B 10/2503* (2013.01); *H04N 21/434* (2013.01); *H04N 21/60* (2013.01); *H04N 21/61* (2013.01); *H04N 21/6106* (2013.01); *H04N 21/65* (2013.01)

(58) Field of Classification Search
None
See application file for complete search history.

(56) References Cited

U.S. PATENT DOCUMENTS

| | | | | |
|---|---|---|---|---|
| 5,425,027 | A * | 6/1995 | Baran | ........................ 370/395.6 |
| 6,115,159 | A * | 9/2000 | Baker | ................................ 398/1 |
| 6,775,483 | B1 * | 8/2004 | Ikushima et al. | ............. 398/186 |
| 2002/0164148 | A1 * | 11/2002 | Kim et al. | ........................ 386/46 |
| 2004/0100684 | A1 * | 5/2004 | Jones et al. | ............. 359/337.11 |
| 2006/0280055 | A1 * | 12/2006 | Miller et al. | ............... 369/44.11 |

FOREIGN PATENT DOCUMENTS

| | | |
|---|---|---|
| JP | 2011-234347 A | 11/2011 |
| KR | 10-2011-0113567 A | 10/2011 |

OTHER PUBLICATIONS

Japanese Office Action mailed Dec. 11, 2012, issued in corresponding Japanese Patent Application No. 2012-161673, filed Jul. 20, 2012, 6 pages.
Korean Office Action mailed Feb. 9, 2015, issued in corresponding Korean Patent Application No. 10-2013-0085236, filed Jul. 19, 2012-2013, 11 pages.

* cited by examiner

*Primary Examiner* — Justin Shepard
(74) *Attorney, Agent, or Firm* — Christnensen O'Connor Johnson Kindness PLLC

(57) ABSTRACT

According to the present invention, in an optical transmission system optically transmitting an optical signal between a first camera adaptor provided to a first video camera, a second camera adaptor provided to a second video camera, and a base station provided at a position remote from the video cameras, the first camera adaptor converts a first electric signal including a video signal component from the first video camera into a first optical signal and transmits the first optical signal to the second camera adaptor. The second camera adaptor receives the first optical signal, converts a second electric signal including a video signal from the second video camera into a second optical signal, and transmits the first and second optical signals to the base station. The base station receives the first and second optical signals, converts the received optical signals into the first and second electric signals, and outputs the electric signals to an external device.

5 Claims, 2 Drawing Sheets

OPTICAL TRANSMISSION SYSTEM

TECHNICAL FIELD

The present invention relates to an optical transmission system that transmits an optical signal between camera adaptors provided to video cameras and a base station provided at a position remote from the video cameras.

BACKGROUND ART

A video signal of video captured by a video camera is transmitted to a device (such as a switcher) through a transmission cable. Because it is difficult to transmit the electric signal without attenuation when the device is positioned remote from the video camera, a camera adaptor provided to the video camera converts the electric signal into an optical signal, and transmits the converted optical signal through an optical transmission cable. Then, a base station positioned remote from the video camera converts the optical signal into an electric signal. As above, long distance transmission is conducted.

SUMMARY OF THE INVENTION

Problems to be Solved by the Invention

The base station is usually provided near a mobile production control room, and a distance may be about 1 km from the mobile production control room to a shooting place. When two video cameras are used for shooting, there are, in general, prepared two optical transmission cables of 1-km long (2-km-long cables in total) for connecting the base station and the camera adaptors.

The present invention is made in view of the above, and provides an optical transmission system that is capable of shortening length of optical transmission cables required when two video cameras are used for shooting.

Means for Solving the Problems

The present invention provides an optical transmission system having:
a first camera adaptor provided to a first video camera;
a second camera adaptor provided to a second video camera; and
a base station provided at a position remote from the first and second video cameras, wherein:
an optical signal is optically transmitted between the first camera adaptor, the second camera adaptor, and the base station;
the first camera adaptor converts a first electric signal including a video signal component from the first video camera into a first optical signal, and transmits the first optical signal to the second camera adaptor;
the second camera adaptor receives the first optical signal, converts a second electric signal including a video signal component from the second video camera into a second optical signal, and transmits the first and second optical signals to the base station; and
the base station receives the first and second optical signals, converts the received optical signals into first and second electric signals, and outputs the first and second electric signals to an external device.

In the optical transmission system, the second camera adaptor has function of a normal camera adaptor that transmits the optical signal between the second video camera and the base station, and also serves as a data transfer point connecting between the first camera adaptor and the base station. Due to the configuration, one optical transmission cable is provided between the base station and the second camera adaptor, and another optical transmission cable is provided between the second camera adaptor and the first camera adaptor. Although the number of required optical transmission cables is the same with the conventional case, the present invention is capable of shortening the length of the required optical transmission cables because the distance between the second camera adaptor and the first camera adaptor is usually shorter than the distance between the base station and the first camera adaptor. For example, there is a case, where the base station, the first camera adaptor, and the second camera adaptor are aligned on a straight line, a distance between the base station and the first camera adaptor is 800 m, and another distance between the base station and the second camera adaptor is 500 m. In the above case, the conventional technique requires optical transmission cables of 1.3 km. The present invention, however, requires optical transmission cables of 800 m in total (one cable of 500 m between the base station and the second camera adaptor and another cable of 300 m between the second camera adaptor and the first camera adaptor). As a result, the length of the required optical transmission cables is shortened by 500 m.

EMBODIMENT CARRYING OUT THE INVENTION

Embodiments of the present invention will be described below with reference to drawings.

1. First Embodiment

1-1. Configuration of Optical Transmission System

Figure 1:
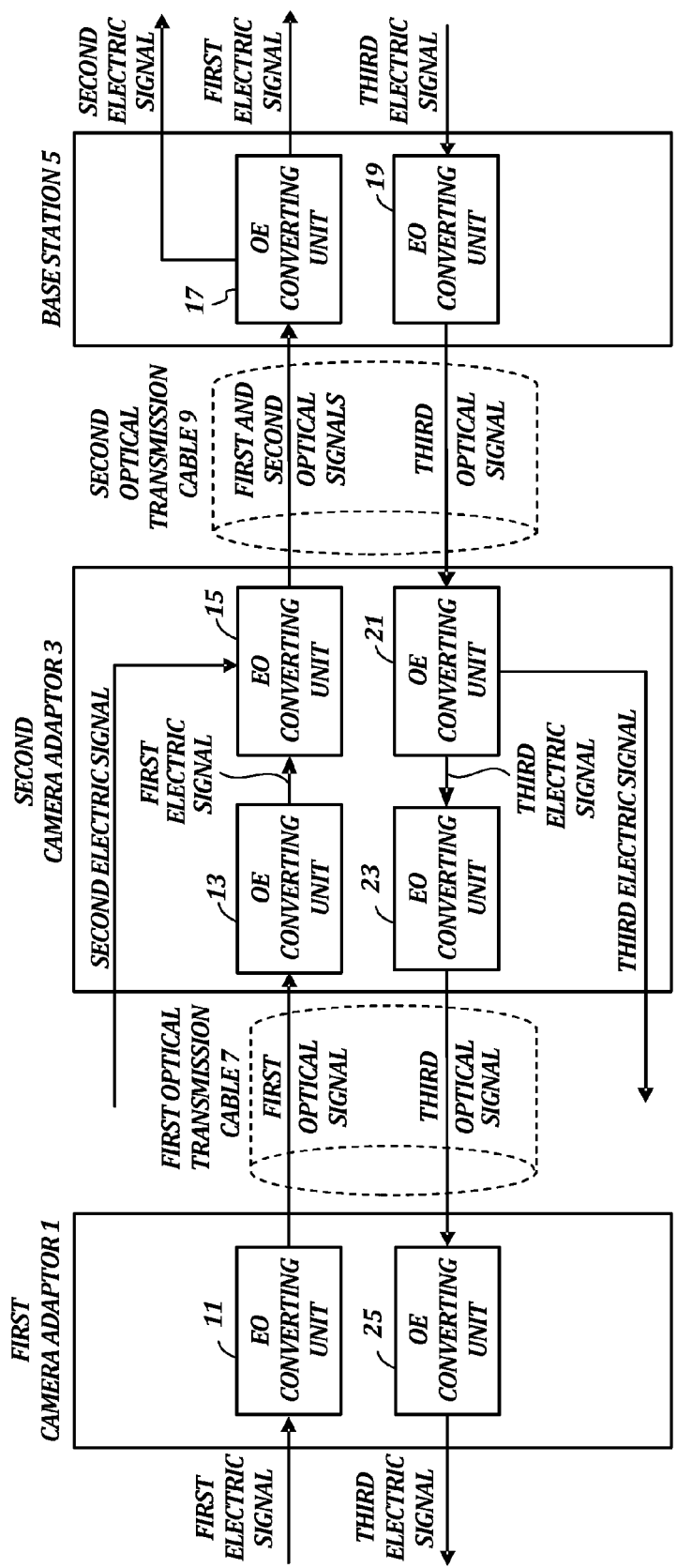
FIG. 1 is a block diagram illustrating an optical transmission system according to the first embodiment of the present invention.

FIG. 1 is used below for explanation of an optical transmission system according to the first embodiment of the present invention. As shown in FIG. 1, the optical transmission system of the first embodiment of the present invention includes a first camera adaptor 1 provided to a first video camera, a second camera adaptor 3 provided to a second video camera, and a base station 5 provided at a position remote from the video cameras. The optical transmission system transmits an optical signal between the first camera adaptor 1, the second camera adaptor 3, and the base station 5. The first camera adaptor 1 converts a first electric signal including a video signal component from the first video camera into a first optical signal, and transmits the first optical signal to the second camera adaptor 3. The second camera adaptor 3 receives the first optical signal, converts a second electric signal including a video signal from the second video camera into a second optical signal, and transmits the first and second optical signals to the base station 5. The base station 5 receives the first and second optical signals, converts the first and second optical signals into the first and second electric signals, and outputs the first and second electric signals to an external device. The base station 5 converts a third electric signal including a video signal component from the external device into a third optical signal, and transmits the third optical signal to the second camera adaptor 3. The second camera adaptor 3 receives the third optical signal, converts the received third optical signal into the third electric signal, outputs the converted third electric signal to an exterior, and transmits the received third optical signal to the first camera adaptor 1.

Each of the components will be described below.

1-2. First Camera Adaptor 1

The first camera adaptor 1 is provided with a first electric signal input terminal assembly, a third electric signal output terminal assembly, and a connection terminal for a first optical transmission cable 7.

The first electric signal may include at least a video signal component, and may further include an intercom audio signal component, an various control signal components. Therefore, the first electric signal input terminal assembly may include, for example, a video signal input terminal, an intercom audio signal input terminal, and a control signal input terminal. The video signal component of the first electric signal is a digital signal (such as, an SDI signal (e.g., an HD-SDI signal, an SD-SDI, a 3G-SDI signal), an HDMI signal, a 3D). The video signal input terminal for the first electric signal is connected with a cable connected with a video signal output terminal of the first video camera. The audio signal input terminal for the first electric signal is connected with a cable connected with a headset. The control signal input terminal for the first electric signal is connected with a cable connected with a control signal output terminal of the first video camera.

The third electric signal may include at least a video signal component, and may further include an intercom audio signal component and various control signal components. Therefore, the third electric signal output terminal assembly may include, for example, a video signal output terminal, an intercom audio signal output terminal, and a control signal output terminal. The video signal component of the third electric signal is a digital signal (such as, SDI signal (e.g., an HD-SDI signal, an SD-SDI, a 3G-SDI signal), an HDMI signal, a 3D). The video signal output terminal for the third electric signal is connected with a cable connected with a video signal input terminal of a video display device (such as a view finder) of the first video camera. The audio signal output terminal for the third electric signal is connected with a cable connected with the headset. The control signal output terminal for the third electric signal is connected with a cable connected with a control signal input terminal of the first video camera. The audio signal input terminal for the first electric signal and the audio signal output terminal for the third electric signal may be assigned to different pins of the same connector.

The connection terminal for the first optical transmission cable 7 is connected with the first optical transmission cable 7 connecting the first camera adaptor 1 with the second camera adaptor 3.

1-3. Second Camera Adaptor 3

The second camera adaptor 3 is provided with a second electric signal input terminal assembly, a third electric signal output terminal assembly, a connection terminal for the first optical transmission cable 7, and a connection terminal for a second optical transmission cable 9.

The second electric signal may include at least a video signal component, and may further include an intercom audio signal component and various control signal components. Therefore, the second electric signal input terminal assembly includes, for example, a video signal input terminal, an intercom audio signal input terminal, and a control signal input terminal. The video signal component of the second electric signal is a digital signal (such as, SDI signal (e.g., an HD-SDI signal, an SD-SDI, a 3G-SDI signal), an HDMI signal, a 3D). The video signal input terminal for the second electric signal is connected with a cable connected with a video signal output terminal of the second video camera. The audio signal input terminal for the second electric signal is connected with a cable connected with a headset. The control signal input terminal for the second electric signal is connected with a cable connected with a control signal output terminal of the second video camera.

The third electric signal output terminal assembly includes, for example, a video signal output terminal, an intercom audio signal output terminal, and a control signal output terminal. The video signal output terminal for the third electric signal is connected with a cable connected with a video signal input terminal of a video display device (such as a view finder) of the second video camera. The audio signal output terminal for the third electric signal is connected with a cable connected with the headset. The control signal output terminal for the third electric signal is connected with a cable connected with a control signal input terminal of the second video camera. The audio signal input terminal for the second electric signal and the audio signal output terminal for the third electric signal may be assigned to different pins of the same connector.

The connection terminal for the first optical transmission cable 7 is connected with the first optical transmission cable 7 connecting the first camera adaptor 1 with the second camera adaptor 3. The connection terminal for the second optical transmission cable 9 is connected with the second optical transmission cable 9 connecting the second camera adaptor 3 with the base station 5.

1-4. Base Station 5

The base station 5 is provided with a first electric signal output terminal assembly, a second electric signal output terminal assembly, a third electric signal input terminal assembly, and a connection terminal for the second optical transmission cable 9.

Each of the first and second electric signal output terminal assemblies includes, for example, a video signal output terminal, an intercom audio signal output terminal, and a control signal output terminal. The video signal output terminals for the first and second electric signals are connected with cables connected with video signal input terminals of an external device (such as a switcher, a relay device). The audio signal output terminals for the first and second electric signals are connected with cables connected with a headset. The control signal output terminals for the first and second electric signals are connected with cables connected with control signal input terminals of the external device.

The third electric signal input terminal assembly includes, for example, a video signal input terminal, an intercom audio signal input terminal, and a control signal input terminal. The video signal input terminal for the third electric signal is connected with a cable connected with a video signal output terminal of the external device. The audio signal input terminal for the third electric signal is connected with a cable connected with the headset. The control signal input terminal for the third electric signal is connected with a cable connected with a control signal output terminal of the external device. The audio signal output terminals for the first and second electric signals and the audio signal input terminal for the third electric signal may be assigned to different pins of the same connector.

The connection terminal for the second optical transmission cable 9 is connected with the second optical transmission cable 9 connecting the second camera adaptor 3 with the base station 5.

1-5. Operation of Optical Transmission System

Operation of the optical transmission system will be detailed below.

Firstly, the first camera adaptor 1 receives the first electric signal including the video signal component from the first video camera. In the first camera adaptor 1, an EO converting unit 11 converts the first electric signal into a first optical signal, and then the first optical signal is transmitted to the second camera adaptor 3 through the first optical transmission cable 7.

In the second camera adaptor 3, an OE converting unit 13 receives the first optical signal and converts the first optical signal into the first electric signal. Also, the second camera adaptor 3 receives the second electric signal including the video signal component from the second video camera. An EO converting unit 15 converts the first and second electric signals into first and second optical signals, respectively, and transmits the first and second optical signals to the base station 5 through the second optical transmission cable 9. The EO converting unit 15 may be configured to transmit the first and second optical signals through a single optical fiber by using various multiplex systems (such as, wavelength-division multiplexing, frequency division multiplexing, time division multiplexing, code division multiplexing) or may be configured to transmit the first and second optical signals through different optical fibers.

In the base station 5, an OE converting unit 17 receives the first and second optical signals, converts the first and second optical signals into the first and second electric signals, and outputs the electric signals to the external device (such as, the switcher, the relay device). In a case, where the first and second optical signals have been transmitted through the different optical fibers, an OE converting unit provided to an end of each optical fiber outputs the signals to the exterior. Also, in another case, where the first and second optical signals have been multiplexed and transmitted, the optical signals are demultiplexed after the optical signals are converted to the electric signals, and the first and second electric signals are retrieved and outputted to the exterior.

Also, the base station 5 receives the third electric signal including the video signal component from the external device (such as, the switcher, the relay device). An EO converting unit 19 converts the third electric signal into a third optical signal and transmits the third optical signal to the second camera adaptor 3. The third optical signal may be transmitted through an optical fiber other than the optical fiber(s) used for the first and second optical signals, or may be multiplexed and transmitted through the same optical fiber used for the first and second optical signals.

In the second camera adaptor 3, an OE converting unit 21 receives the third optical signal, converts the optical signal into the third electric signal, and outputs the electric signal to the video display device provided to the second video camera. An EO converting unit 23 converts the third electric signal into the third optical signal and transmits the optical signal to the first camera adaptor 1. The third optical signal may be transmitted through an optical fiber other than the optical fiber used for the first optical signal, or may be multiplexed and transmitted through the same optical fiber used for the first optical signal.

In the first camera adaptor, an OE converting unit 25 receives the third optical signal, converts the optical signal into the third electric signal, and outputs the electric signal to the exterior, such as the video display device provided to the first video camera.

Due to the configuration of the present embodiment, the first camera adaptor 1 is connected with the second camera adaptor 3 through the optical transmission cable instead of being connected with the base station 5 through an optical transmission cable. As a result, it is possible to shorten the required length of the optical transmission cable.

2. Second Embodiment

Figure 2:
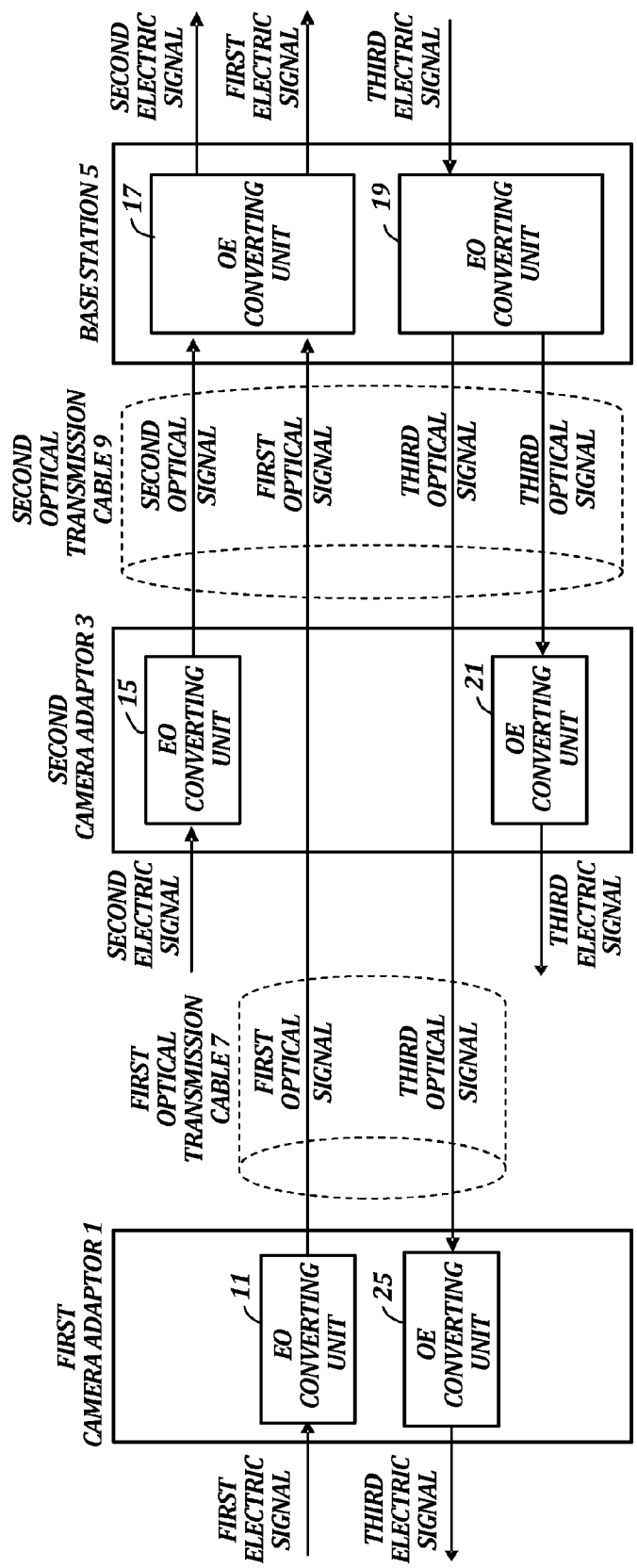
FIG. 2 is a block diagram illustrating an optical transmission system according to the second embodiment of the present invention.

An optical transmission system according to the second embodiment of the present invention will be described with reference to FIG. 2. In the first embodiment, the first optical signal from the first camera adaptor 1 and the third optical signal from the base station 5 are once converted into the electric signals and then, the electric signals are converted back to the optical signals for transmission. The present embodiment, however, eliminates the above conversion of the optical signal into the electric signal, then back to the optical signal. The optical transmission system is configured such that the first optical signal from the first camera adaptor 1 is transmitted to the base station 5 as the optical signal, and the third optical signal from the base station 5 is transmitted to the first camera adaptor 1 as the optical signal. According to the above configuration, because the second camera adaptor 3 has a function to simply connect the first optical transmission cable 7 with the second optical transmission cable 9, communication between the first camera adaptor 1 and the base station 5 will not be broken advantageously even when the electrical system of the second camera adaptor 3 fails. Note that, the second camera adaptor 3 may have a function to amplify the optical signal when the optical signal has been attenuated.

Also, in the above configuration, the first optical signal and the second optical signal are usually transmitted through different optical fibers within the second optical transmission cable 9. In the above case, the second optical transmission cable 9 has two or more optical fibers. Also, the third optical signal is inputted into each of the two optical fibers, and the third optical signal of one of the optical fibers is transmitted to the first camera adaptor 1 in an optical format. The third signal of the other optical fiber is converted into the third electric signal by an OE convertor 21 of the second camera adaptor 3, and the third electric signal is outputted. The third optical signal may be transmitted through an optical fiber other than the optical fibers used for the first and second optical signals, or may be multiplexed and transmitted through the same optical fiber used for the first and second optical signals.

Also, in other embodiment, the second camera adaptor 3 may include an optical splitter such that the third optical signal transmitted through a single optical fiber is splitted within the second camera adaptor. One of the split optical signals may be transmitted to the first camera adaptor 1 as the optical signal. The other one may be converted into the third electric signal and the converted electric signal may be outputted.

The invention claimed is:

1. An optical transmission system comprising:
a first camera adaptor provided to a first video camera;
a second camera adaptor provided to a second video camera; and
a base station provided at a position remote from the first and second video cameras, wherein a distance between the second camera adaptor and the first camera adaptor is shorter than a distance between the base station and the first camera adaptor, and wherein:
an optical signal is optically transmitted between the first camera adaptor, the second camera adaptor, and the base station;
the first camera adaptor converts a first electric signal including a video signal component from the first video camera into a first optical signal, and transmits the first optical signal to the second camera adaptor;
the second camera adaptor receives the first optical signal, converts a second electric signal including a video signal component from the second video camera into a second optical signal, multiplexes the first and second optical signals, and transmits the multiplexed first and second optical signals to the base station such that the second camera adaptor functions both as a camera adaptor to transmit an optical signal from the second camera to the base station and as a data transfer point to connect between the first camera adaptor and the base station; and
the base station receives the multiplexed first and second optical signals, demultiplexes the multiplexed first and second optical signals, converts the received first and second optical signals into the first and second electric signals, and outputs the first and second electric signals to an external device.

2. The optical transmission system according to claim 1, wherein:
the base station converts a third electric signal including a video signal component from the external device into a third optical signal, and transmits the third optical signal to the second camera adaptor; and
the second camera adaptor receives the third optical signal, converts the received third optical signal into the third electric signal, outputs the converted third electric signal to an exterior, and transmits the received third optical signal to the first camera adaptor.

3. The optical transmission system according to claim 1 or 2, wherein:
after the second camera adaptor receives the first optical signal, the second camera adaptor transmits the received first optical signal to the base station in an optical format without converting the first optical signal into an electric signal.

4. A camera adaptor for use in an optical transmission system comprising a first video camera, a second video camera, and a base station, the camera adaptor comprising:
an optical signal receiver configured to receive a first optical signal from the first video camera, the first optical signal comprising a video signal component from the first video camera, the first video camera comprising a first camera adaptor configured to convert a first electric signal including the video signal component from the first video camera into the first optical signal;
an electric signal receiver configured to receive a second electric signal including a video signal component from the second video camera;
an electric to optical converting unit configured to convert the second electric signal into a second optical signal; and
an optical transmitter configured to multiplex the first and second optical signals and to transmit the multiplexed first and second optical signals to the base station such that the camera adaptor functions both as a camera adaptor to transmit the video signal component from the second video camera to the base station and as a data transfer point to connect between the first camera adaptor and the base station,
wherein the base station is configured to receive the multiplexed first and second optical signals from the camera adaptor, to demultiplex the multiplexed first and second optical signals, to convert the received first and second optical signals into the first and second electric signals, and to output the first and second electric signals to an external device, and
wherein a distance between the second video camera and the first video camera is shorter than a distance between the base station and the first video camera.

5. A camera adaptor for use in an optical transmission system comprising a first video camera, a second video camera, and a base station, the camera adaptor comprising:
an optical signal receiver configured to receive a first optical signal from the first video camera, the first optical signal comprising a video signal component from the first video camera, the first video camera comprising a first camera adaptor configured to convert a first electric signal including the video signal component from the first video camera into the first optical signal;
an electric signal receiver configured to receive a second electric signal including a video signal component from the second video camera;
an electric to optical converting unit configured to convert the second electric signal into a second optical signal; and
an optical transmitter configured to transmit the first optical signal along a first optical fiber to the base station, and to transmit the second optical signal along a second optical fiber to the base station,
wherein the camera adaptor functions both as a camera adaptor to transmit the video signal component from the second video camera to the base station and as a data transfer point to connect between the first camera adaptor and the base station,
wherein the base station is configured to receive the first and second optical signals from the camera adaptor, to convert the received first and second optical signals into the first and second electric signals, and to output the first and second electric signals to an external device, and
wherein a distance between the second video camera and the first video camera is shorter than a distance between the base station and the first video camera.

* * * * *